(12) United States Patent
Peng

(10) Patent No.: US 8,248,787 B2
(45) Date of Patent: Aug. 21, 2012

(54) PORTABLE ELECTRONIC DEVICE WITH SLIDABLE COVER

(75) Inventor: Liang-Tian Peng, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 236 days.

(21) Appl. No.: 12/758,114

(22) Filed: Apr. 12, 2010

(65) Prior Publication Data

US 2011/0157781 A1    Jun. 30, 2011

(30) Foreign Application Priority Data

Dec. 31, 2009    (CN) .................. 2009 2 0319388 U

(51) Int. Cl.
*G06F 1/16* (2006.01)

(52) U.S. Cl. .................. 361/679.55; 455/575.3; 396/52; 348/376

(58) Field of Classification Search ............... 455/575.1, 455/575.2, 575.3; 396/52; 348/376; 361/679.01, 361/679.02, 679.1, 679.23, 679.27, 679.29, 361/679.39
See application file for complete search history.

(56) References Cited

U.S. PATENT DOCUMENTS

2006/0140599 A1* 6/2006 Nomura et al. ................. 396/52
2010/0128167 A1* 5/2010 Hsu .............................. 348/376
2011/0151947 A1* 6/2011 Griffin et al. .............. 455/575.3

* cited by examiner

*Primary Examiner* — Hung Duong
(74) *Attorney, Agent, or Firm* — Altis Law Group, Inc.

(57) ABSTRACT

A portable electronic device includes a base, a cover, and a connecting module. The connecting module includes two connecting plates and at least one hinge. At least one of the connecting plates is rotatably connected to the base or cover by the at least one hinge, and the cover rides the base when rotated and slid thereon.

18 Claims, 3 Drawing Sheets

PORTABLE ELECTRONIC DEVICE WITH SLIDABLE COVER

BACKGROUND

1. Technical Field

The disclosure relates to portable electronic devices, especially to a portable electronic device with an adjustable cover.

2. Description of Related Art

Portable electronic devices, such as mobile phones, notebooks, and others, often have a base and a cover with a display. The cover is fixed to the base such that the display can only be adjusted on one axis, causing inconvenience of use.

Therefore, there is room for improvement within the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the portable electronic device with an adjustable cover. Moreover, in the drawings, like reference numerals designate corresponding parts throughout the several views, in which.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
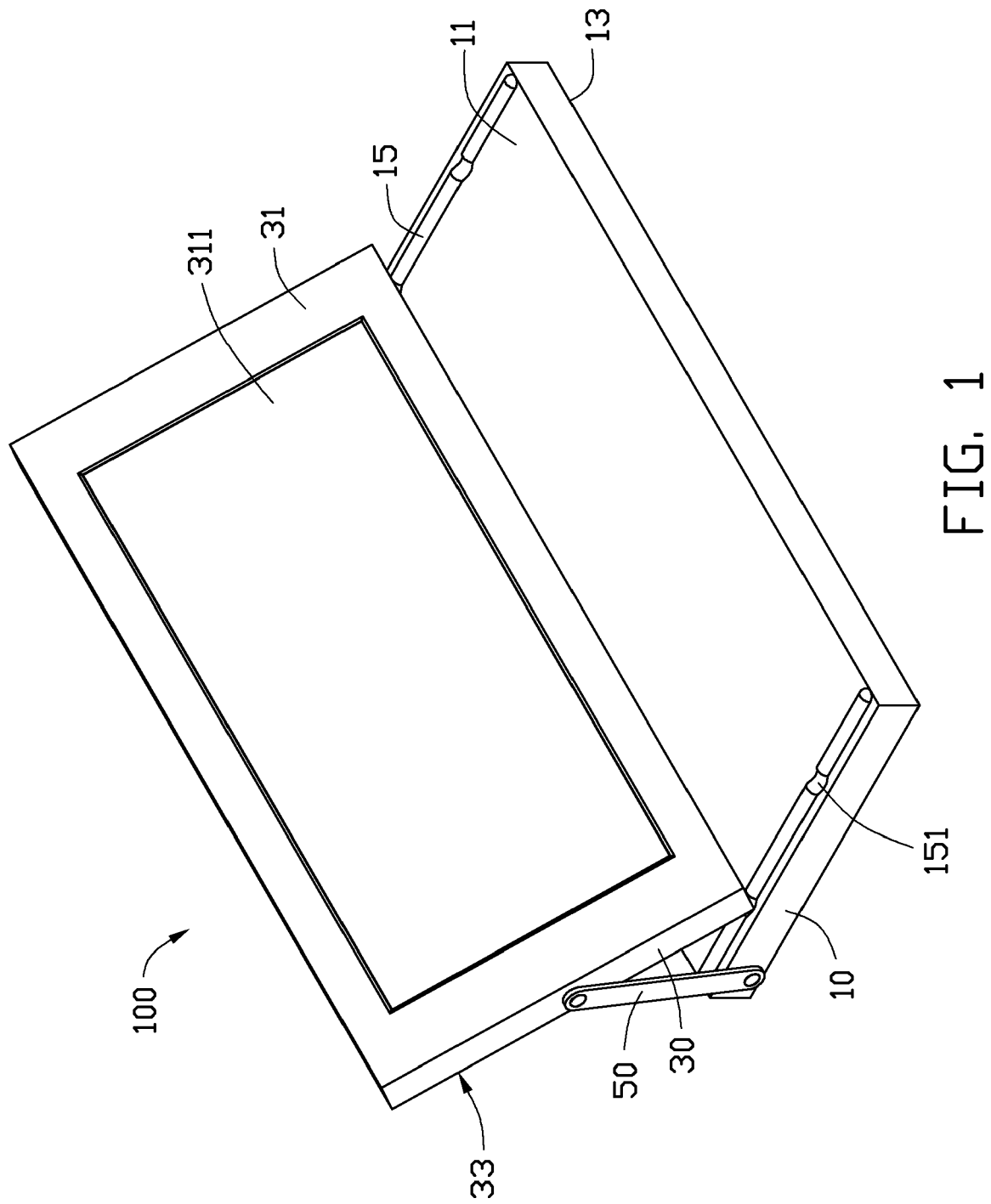
FIG. 1 is an isometric view of an exemplary embodiment of a portable electronic device, shown open.

FIG. 1 shows an exemplary embodiment of a portable electronic device 100. The portable electronic device 100 includes a base 11, a cover 30, and a connecting module 50. The cover 30 is rotatably and pivotally attached to the base 10 by the connecting module 50.

Figure 2:
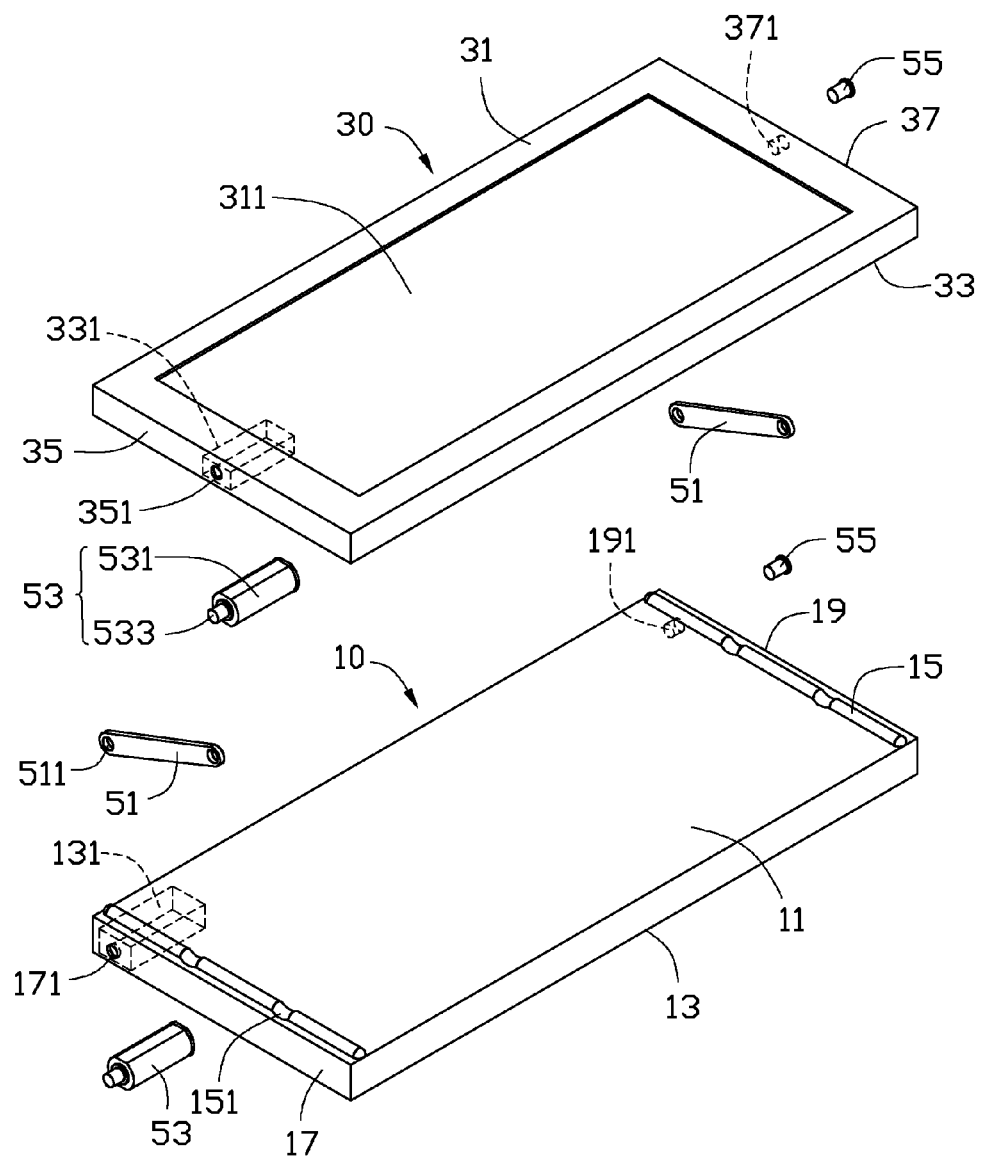
FIG. 2 is an exploded, isometric view of the portable electronic device of FIG. 1.

Referring to FIG. 2, the base 10 includes an upper surface 11, a lower surface 13 opposite to the upper surface 11, a first sidewall 17 and a second sidewall 19 opposite to the first sidewall 17. Two ridges 15 are formed on the upper surface 11, each approximately parallel to the sidewalls 17, 19. The upper surface 11 can further include a keypad (not shown) enabling input to the portable electronic device 100. Each ridge 15 defines at least one notch 151, therein. The exposed surfaces of the ridges 15 are curved. The base 10 defines a receiving cavity 131, a connecting hole 171 in the first sidewall 17 communicating with the receiving cavity 131, and a receiving hole 191 in the second sidewall 19. In this exemplary embodiment, the connecting hole 171 and the receiving hole 191 are coaxial.

The cover 30 includes a first surface 31, a second surface 33 opposite to the first surface 31, a first end wall 35, and a second end wall 37 opposite to the first end wall 35. The first surface 31 may have a display 311 for displaying information. In this exemplary embodiment, the display 311 is a touchscreen, additionally providing input to the portable electronic device 100 thereby. The cover 30 defines a connecting hole 351 at an approximate center of the first end wall 35, a receiving cavity 331 communicating with the connecting hole 351, and a receiving hole 371 at the approximately center of the second end wall 37.

The connecting module 50 includes two connecting plates 51, two hinges 53 respectively received in the receiving cavities 131, 331, and two pins 55 respectively received in the receiving holes 191, 371. Each connecting plate 51 defines a receiving cutout 511 at each end. Each hinge 53 includes a housing 531 and a shaft 533 rotatably attached to the housing 531. The shaft 533 rotates to an included angle of 180° or less relative to the housing 531. In the exemplary embodiment, the included angle is 30° to 120°, and preferably the included angle is about 60°.

Figure 3:
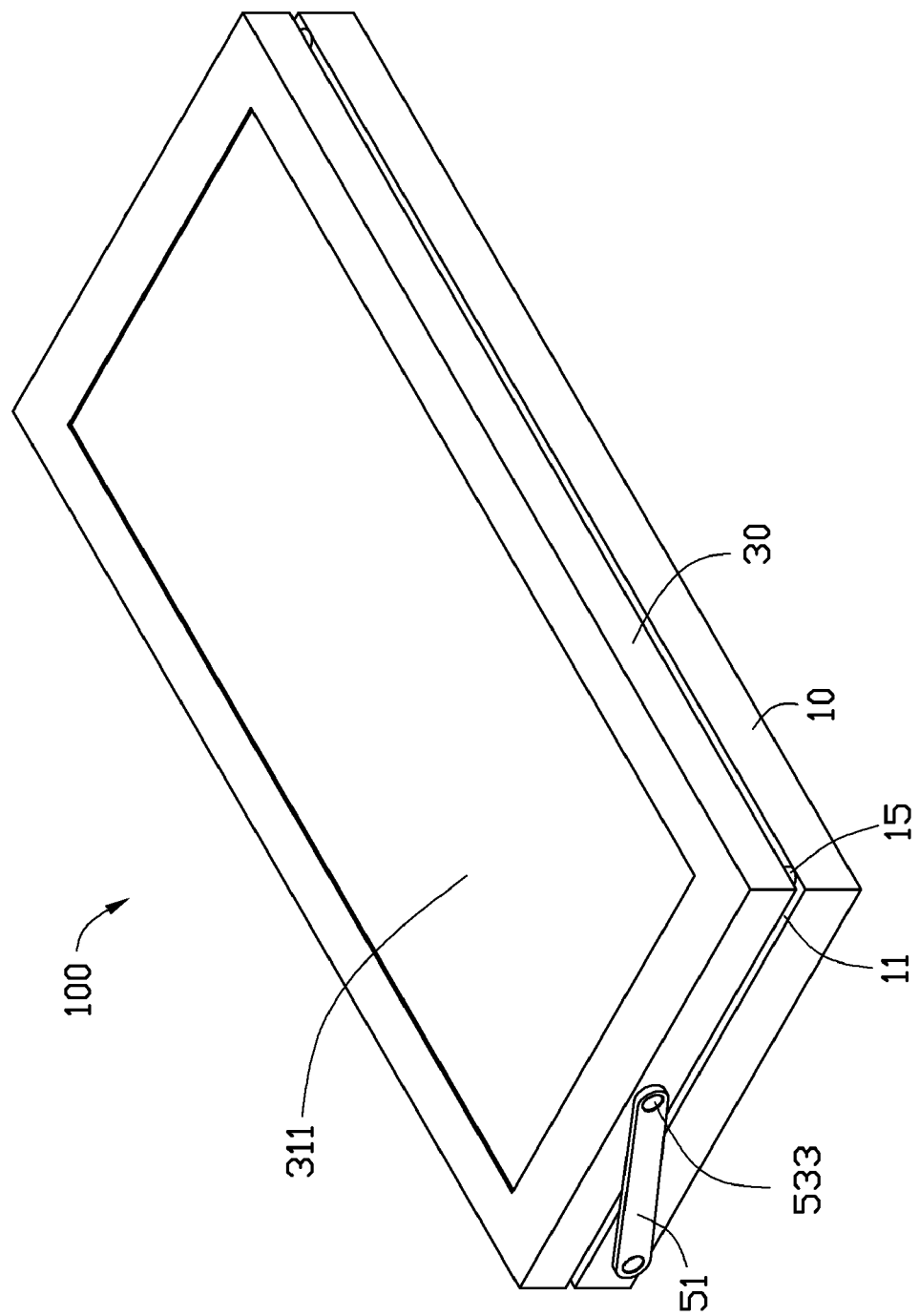
FIG. 3 is an assembled, isometric view of the portable electronic device of FIG. 1.

During assembly of the portable electronic device 100, the housings 531 of the hinges 53 are respectively received in the receiving cavities 131, 331, and the shafts 533 pass through and extend out of the connecting holes 171, 351. One of the connecting plates 51 is rotatably attached to the two hinges 53 by the shafts 533, each shaft 533 received in a corresponding cutout 511. The two pins 55 respectively pass through the cutouts 511 of the other connecting plate 51 and are rotatably received in the receiving holes 191, 371. Thus, the portable electronic device 100 is assembled, as shown in FIG. 3. When closed, the cover 30 covers the upper surface 11 of the base 10 to protect the keypad.

To adjust the display 311 relative to the base 10 or expose the upper surface 11, the user pushes cover 30 towards the receiving cavity 131 and the cover 30 then slides along the ridges 15 of the base 10. The edge of the cover 30 adjacent to the receiving cavity 131 rotates upwards from the upper surface 11 due to the restriction of the connecting plates 51 and the other edge of the cover 30 ride the ridges 15 until received in the notches 151, whereby the cover 30 stays at a fixed angular position relative to the upper surface 11. The cover 30 can be further pushed until the shafts 533 of the hinges 53 rotate to a maximum angle relative to the housings 531, and the cover 30 slides and rotates relative to the base 10 such that the display 311 can be adjusted to a preferred maximum angle.

It is notable that one of the hinges can be replaced by a pin, and the pins can be replaced by hinges. The notches 151 of the ridges may be omitted. Further, at least part of the base 10 and cover 30 can include magnetic materials with different polarities or soft magnetic material such that the base 10 attracts the cover 30 by magnetic force when the portable electronic device 100 is closed.

The cover 30 provides translational and rotational movement relative to the base 10 and can accordingly be adjusted to a preferred position along multiple axes. Further, one edge of the cover 30 rides the ridges 15 so the movement is smooth and stable.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A portable electronic device comprising:
   a base, two ridges formed on the base at opposite edges;
   a cover riding the ridges; and
   a connecting module comprising:
      two connecting plates; and
      at least one hinge;
   wherein at least one of the connecting plates is rotatably connected to the base or the cover by the at least one hinge, and the cover rides the base when the cover rotates and slides relative to the base.

2. The portable electronic device as claimed in claim 1, wherein the exposed surfaces of the ridges are curved.

3. The portable electronic device as claimed in claim 1, wherein each ridge defines at least one notch, in which the cover is received.

4. The portable electronic device as claimed in claim 1, wherein two hinges are deployed, the portable electronic device further comprises two pins, and the connecting plates are rotatably connected to the base and the cover by hinge or pin.

5. The portable electronic device as claimed in claim 4, wherein the base defines a receiving cavity, a connecting hole communicating with the receiving cavity, and a receiving hole, wherein one of the hinges is received in a receiving cavity and extends out of the connecting hole, and one of the pins is received in a receiving hole and extends out of the receiving hole.

6. The portable electronic device as claimed in claim 5, wherein the connecting hole and the receiving hole are coaxial.

7. The portable electronic device as claimed in claim 1, wherein the at least one hinge comprises a housing and a shaft rotatably attached to the housing, the shaft rotates at an included angle of 180° or less relative to the housing and remains in position.

8. The portable electronic device as claimed in claim 7, wherein the included angle is 30° to 120°.

9. The portable electronic device as claimed in claim 8, wherein the included angle is about 60°.

10. A portable electronic device comprising:
a base comprising an upper surface;
a cover comprising a first surface with a display and a second surface opposite to the first surface;
a connecting plate; and
a hinge comprising a housing and a shaft rotatably attached to the housing;
wherein the connecting plate is rotatably connected to the base by the hinge, an angle range between the upper surface and the second surface of the cover is restricted by the rotation that the shaft rotates relative to the housing, and wherein the cover abuts the base when the cover rotates and slides relative to the base.

11. The portable electronic device as claimed in claim 10, wherein the base forms two ridges at two opposite edges, along which the cover slides.

12. The portable electronic device as claimed in claim 11, wherein the exposed surfaces of the ridges are curved.

13. The portable electronic device as claimed in claim 11, wherein each ridge defines at least one notch, in which the cover is received.

14. The portable electronic device as claimed in claim 10, further comprising three pins, by which, along with the hinge, the connecting plate is rotatably connected to the base and the cover.

15. The portable electronic device as claimed in claim 14, wherein the base defines a receiving cavity and a connecting hole communicating with the receiving cavity, wherein the housing of the hinge is received in the receiving cavity and the shaft of the hinge extents out of the connecting hole.

16. The portable electronic device as claimed in claim 10, wherein the shaft rotates an included angle of 180° or less relative to the housing and remains in position.

17. The portable electronic device as claimed in claim 16, wherein the included angle is 30° to 120°.

18. The portable electronic device as claimed in claim 17, wherein the included angle is about 60°.

\* \* \* \* \*